（12）United States Patent
Swales et al.

(10) Patent No.: US 8,412,396 B2
(45) Date of Patent: Apr. 2, 2013

(54) ELECTRIC LAUNCH OF A HYBRID VEHICLE HAVING A BELT ALTERNATOR STARTER AND A DUAL CLUTCH TRANSMISSION

(75) Inventors: Shawn H. Swales, Canton, MI (US); Hong Yang, Rochester Hills, MI (US); Min-Joong Kim, Bloomfield Hills, MI (US); Shawn Scott Hawkins, Shelby Township, MI (US); Amanda Luedtke, Berkley, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 347 days.

(21) Appl. No.: 12/794,818

(22) Filed: Jun. 7, 2010

(65) Prior Publication Data

US 2011/0301791 A1   Dec. 8, 2011

(51) Int. Cl.
*B60L 3/00* (2006.01)
*B60L 9/00* (2006.01)
*B60L 11/00* (2006.01)
*B60W 10/02* (2006.01)
*B60W 10/08* (2006.01)

(52) U.S. Cl. ............................ 701/22; 701/21; 477/5
(58) Field of Classification Search ............... 701/200, 701/21, 22; 477/5
See application file for complete search history.

(56) References Cited

U.S. PATENT DOCUMENTS

| | | | | |
|---|---|---|---|---|
| 6,827,167 | B2* | 12/2004 | Cikanek et al. | 180/65.6 |
| 7,182,710 | B2* | 2/2007 | Surampudi | 477/77 |
| 2008/0288146 | A1* | 11/2008 | Beechie et al. | 701/58 |
| 2009/0312143 | A1* | 12/2009 | Allgaier et al. | 477/5 |
| 2010/0023230 | A1* | 1/2010 | Holmes | 701/51 |
| 2010/0198436 | A1* | 8/2010 | Falkenstein | 701/22 |
| 2010/0228449 | A1* | 9/2010 | Takahashi et al. | 701/51 |
| 2010/0250084 | A1* | 9/2010 | Takiguchi et al. | 701/70 |
| 2010/0279818 | A1* | 11/2010 | Soliman et al. | 477/5 |
| 2011/0269599 | A1* | 11/2011 | Nakasako | 477/5 |
| 2012/0035822 | A1* | 2/2012 | Mueller | 701/70 |

* cited by examiner

*Primary Examiner* — Faris Almatrahi
*Assistant Examiner* — Ariel Yu
(74) *Attorney, Agent, or Firm* — Quinn Law Group, PLLC

(57) ABSTRACT

A controller-executable method provides an electric-only (EV) launch mode in a vehicle having an accelerator pedal, an engine, a motor generator unit (MGU), a dual-clutch transmission (DCT), and a belt alternator starter system adapted for selectively rotating the crankshaft using motor torque from the MGU. Execution of the method uses motor torque from the MGU, while the engine is off, to accelerate the crankshaft to above a calibrated launch speed when a threshold minimum force is applied to the pedal. A designated one of the odd- and even-gear clutches of the DCT are controlled until input torque to the DCT equals a calibrated level. The other DCT clutch may be modulated to dampen drivetrain oscillations. The vehicle launches in the EV launch mode via the designated DCT clutch when the crankshaft speed exceeds an input speed of the DCT. The vehicle and controller are also provided.

19 Claims, 2 Drawing Sheets

ELECTRIC LAUNCH OF A HYBRID VEHICLE HAVING A BELT ALTERNATOR STARTER AND A DUAL CLUTCH TRANSMISSION

TECHNICAL FIELD

The present invention relates to a powertrain control method and system for optimizing fuel economy aboard a hybrid electric vehicle during vehicle launch.

BACKGROUND

A hybrid electric vehicle (HEV) can selectively utilize different onboard energy sources in order to fully optimize fuel economy. Power sources typically include an internal combustion engine and at least one high-voltage motor/generator unit (MGU), which may draw power from and deliver power to a battery as needed. A full hybrid powertrain can be used to electrically propel the HEV in an electric-only (EV) mode, while a mild hybrid powertrain has less EV propulsion capability but retains certain fuel saving features, such as engine auto-stop/auto-start functionality and regenerative braking.

Engine auto-stop/auto-start functionality allows an HEV to shut off its engine when at a stop, and to instantly restart the engine when a brake pedal is released and an accelerator pedal is depressed with a sufficient amount of force. Power needed for cranking the engine can be provided by an auxiliary starter motor, or in the case of a belt alternator starter (BAS) system in some mild hybrid designs, via motor torque from the MGU. Once started, the engine of a BAS-equipped HEV delivers the required torque to a set of drive wheels for propelling the HEV.

SUMMARY

Accordingly, a powertrain control method as provided herein optimizes fuel economy in a mild hybrid electric vehicle (HEV) having a dual-clutch transmission (DCT) and a belt alternator starter (BAS) system. The HEV includes a high-voltage motor generator unit (MGU) adapted to assist an automatic restarting of the engine after an engine auto-stop event. The method may be embodied as an algorithm, and automatically executed onboard the HEV via a hardware module of an onboard controller to thereby modulate the odd-gear and even-gear clutches of the DCT in a particular manner during an electric-only (EV)/engine-off launch mode, thereby minimizing energy loss during EV launch mode.

In particular, a method provides an EV launch mode in a hybrid electric vehicle having an accelerator pedal, an engine having a crankshaft, an MGU, and a DCT with different odd-gear and even-gear clutches, as is well understood in the art. The vehicle also includes a BAS system for selectively rotating the crankshaft using motor torque from the MGU. The method includes using the motor torque, while the engine is off, to increase a rotational speed of the crankshaft to above a calibrated EV launch speed when a threshold minimum force is applied to the accelerator pedal. An operation of a designated one of the odd-gear clutch and even-gear clutch is controlled until input torque to the DCT equals a calibrated level.

The method may further include modulating the other of the odd-gear and even-gear clutch to dampen drivetrain oscillations, with launching the vehicle occurring in the EV launch mode via the designated clutch when the crankshaft speed exceeds transmission input speed. As used herein, the term "modulating" refers to the application of the clutch at a desired capacity, in order to accomplish a desired result, such as gradual synchronization in a rotational speed of rotating members, or the addition of frictional damping to a dynamic system such as the powertrain. In one embodiment, the odd-gear clutch is the designated clutch for a $1^{st}$ or $3^{rd}$ gear launch, although the even-gear clutch can be used to implement a $2^{nd}$ gear launch without departing from the scope of the present invention.

A vehicle includes an accelerator pedal, an engine having a crankshaft, an MGU, a DCT with different odd-gear and even-gear clutches, a BAS system adapted for selectively rotating the crankshaft using motor torque from the MGU, and a controller. The controller launches the vehicle in an EV launch mode as noted above, i.e., by using the MGU to control engine speed during the EV launch mode, and by controlling a designated one of the odd-gear and even-gear clutches of the DCT to control the EV launch, optionally modulating or applying and slipping the other DCT clutch as needed, e.g., as a noise or rattle countermeasure.

A controller is also provided herein for use with the vehicle noted above. The controller includes a hardware module and an algorithm. Execution of the algorithm by the hardware module launches the vehicle using a designated DCT clutch in the EV launch mode as set forth above.

The above features and advantages and other features and advantages of the present invention are readily apparent from the following detailed description of the best modes for carrying out the invention when taken in connection with the accompanying drawings.

DETAILED DESCRIPTION

Figure 1:
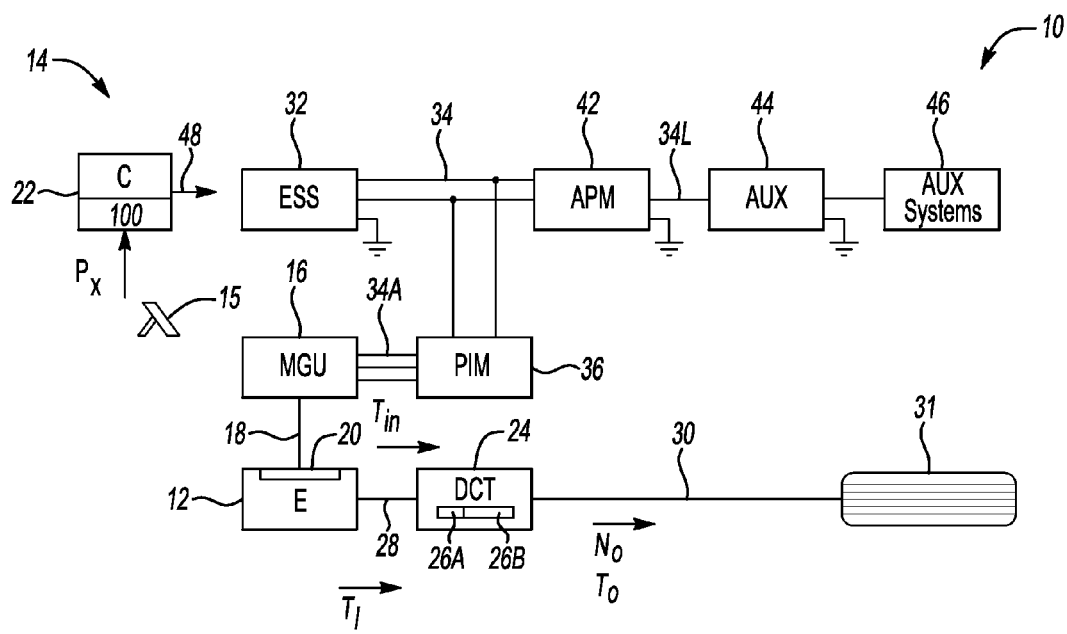
FIG. 1 is a schematic illustration of a belt alternator starter (BAS)-equipped vehicle in accordance with the present invention.

Referring to the drawings, wherein like reference numbers correspond to like or similar components throughout the several figures, a mild hybrid electric vehicle 10 is shown in FIG. 1. Vehicle 10 includes an internal combustion engine (E) 12 with auto-stop/start functionality, i.e., the engine is adapted to automatically shut off when the vehicle is stationary in order to minimize idle fuel consumption, and to automatically restart when an operator of the vehicle signals a desire to resume forward or reverse travel via depression of an accelerator pedal 15 with a threshold amount of force. Pedal 15 has a detectable pedal position (arrow $P_x$), which is transmitted to and/or otherwise read by an onboard controller (C) 14 as an available input signal for determining when an operator of vehicle 10 wishes to initiate travel.

When engine 12 is to be restarted, controller 14 signals a high-voltage motor/generator unit (MGU) 16, e.g., a multi-phase electric machine, delivers sufficient motor torque via a belt 18 to a crankshaft 20 of the engine, thereby rotating the crankshaft to a calibrated threshold starting speed. A system adapted to use the MGU 16 and belt 18 for this purpose is most commonly referred to as a belt alternator starter (BAS) system as noted above.

Controller 14 may be configured as one or more digital computers each having a microprocessor or central processing unit, read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the controller 14 or accessible thereby, including a powertrain control algorithm 100 as described below with reference to FIG. 3, can be stored in ROM and automatically executed by the controller to provide the respective functionality. Controller 14 includes a hardware module 22 programmed with or having access to the algorithm 100, the execution of which maximizes fuel economy during an electric-only (EV) launch mode, i.e., an engine-off launch of vehicle 10 as set forth below with reference to FIGS. 2 and 3.

Still referring to FIG. 1, the vehicle 10 includes a dual-clutch transmission (DCT) 24, which as used herein refers to an automated, manual-like transmission having a gearbox with two independently-operated torque transfer mechanisms or clutches, i.e., an even-gear clutch 26A controlling selection of any even-numbered gears, e.g., second, fourth, sixth, etc., and an odd-gear clutch 26B controlling selection of any odd-numbered gears. Associated electronic and hydraulic clutch control devices (not shown) control the shift operation of the DCT 24. The DCT 24 is a dry DCT in one embodiment, i.e., having clutches in a non-lubricated environment, although a wet DCT may also be envisioned. A dry DCT design lacks an engine-driven pump, and therefore use of a dry DCT may eliminate one of the restrictions on minimum engine speed during vehicle launch.

Using this odd/even gear arrangement, the various gears DCT 24 can be shifted without totally interrupting input torque ($T_{IN}$) from the engine 12, as is well understood in the art. DCT 24 has a rotatable input member 28 connected to the output side of the engine 12, and a rotatable output member 30 connected to a set of drive wheels 31. The DCT 24 ultimately transmits output torque ($T_O$) to the wheels 31 via the output member 30, which rotates at an output speed ($N_O$), in response to a speed request determined by the controller 14 when an operator applies force to pedal 15.

MGU 16 may be electrically-connected to an HV battery or energy storage system (ESS) 32 via an HV direct current (DC) bus 34, a voltage inverter/power inverter module (PIM) 36, and an HV alternating current (AC) bus 34A. ESS 32 may be selectively recharged using the MGU 16 when the MGU is operating as a generator, for example by capturing energy during a regenerative braking event. Vehicle 10 may also include an auxiliary power module (APM) 42, e.g., a DC-DC power converter, which is electrically-connected to the ESS 32 via the HV DC bus 34. APM 42 may also be electrically-connected to an auxiliary battery (AUX) 44, e.g., a 12-volt DC battery, via a low-voltage (LV) bus 34L, and adapted for energizing one or more auxiliary systems 46 aboard the vehicle 10.

Still referring to FIG. 1, the controller 14 may be configured as a single control device or a distributed control device that is electrically connected to or otherwise placed in electrical communication with engine 12, MGU 16, ESS 32, APM 42, PIM 36, and the auxiliary battery 44 via wired or wireless control channels (arrow 48). Control channels 48 may include any required transfer conductors, e.g., a hard-wired or wireless control link(s) or path(s) suitable for transmitting and receiving the necessary electrical control signals for proper power flow control and coordination aboard vehicle 10. The controller 14 may include such control modules and capabilities as might be necessary to execute all required power flow control functionality aboard the vehicle 10 in the desired manner.

Within the scope of the present invention, execution of algorithm 100 by hardware module 22 controls torque delivery from the MGU 16 and a shift operation or sequence of the DCT 24 in order to provide a relatively efficient EV launch mode. In the vehicle 10, which is an HEV having a BAS system, the MGU 16 is capable of rapidly delivering torque to its point of use, particularly in comparison to an internal combustion engine. Engine flare is thus provided only to the point needed to avoid a predetermined level or threshold of noise, vibration, and harshness (NVH) resonance, as well as the oscillation of the powertrain on its mounts as understood in the art. Algorithm 100 allows for a relatively low EV launch speed, with the energy saved being roughly proportional to the square of the change in engine speed at launch. A small amount of engine flare still provides a comfortable launch feel in the EV launch mode, while still avoiding the NVH boundary as set forth below with reference to FIG. 3.

Controller 14 thus controls two main variables during an EV launch: (1) torque transferred through the respective even-gear and odd-gear clutches 26A, 26B of DCT 22, and (2) a rotational speed of the MGU 16 for controlling the amount of engine flare during the EV launch mode. Depression of accelerator pedal 15 with a first level of travel or force e.g., approximately 20 to 30 percent of an available pedal travel range or force capacity, can therefore trigger a conventional engine-on vehicle launch, while a substantially lower second level of force, e.g., approximately 10% of pedal travel or force, can signal the controller 14 to execute an EV launch as detailed in FIG. 3.

Figure 2:
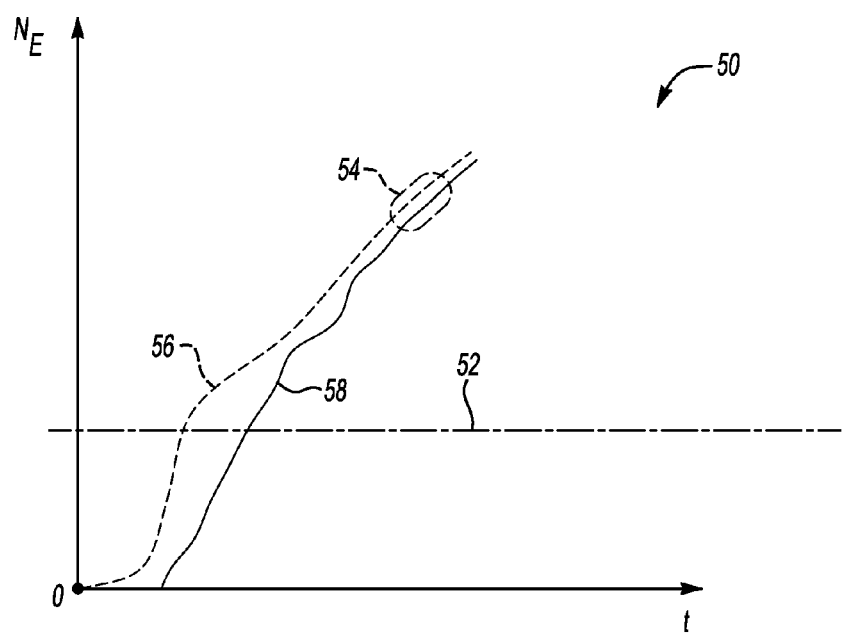
FIG. 2 is a graph illustrating engine speed control during an electric-only (EV) launch mode of the vehicle shown in FIG. 1.

Referring to FIG. 2, a trace 50 describes the changing crankshaft speed (trace 56) versus changing transmission input speed (trace 58) over a period of time (t), in particular during the EV launch mode. Controller 14 allows MGU 16 to deliver torque to the crankshaft 20, rotating the crankshaft until it exceeds a calibrated NVH threshold 52. Speed control of engine 12 is maintained until engine speed reaches a calibrated slip zone 54, i.e., a targeted slip zone akin to an Electronic Converter Clutch Control (ECCC) zone in which a minimum target slip level is provided across the clutch, e.g., approximately 20 to 40 RPM in one embodiment, as will be understood by those of ordinary skill in the art. EV launch can then be completed from first gear, or alternately in second or third gear, depending on the application. The precise manner in which this is accomplished will now be explained with reference to FIG. 3.

Figure 3:
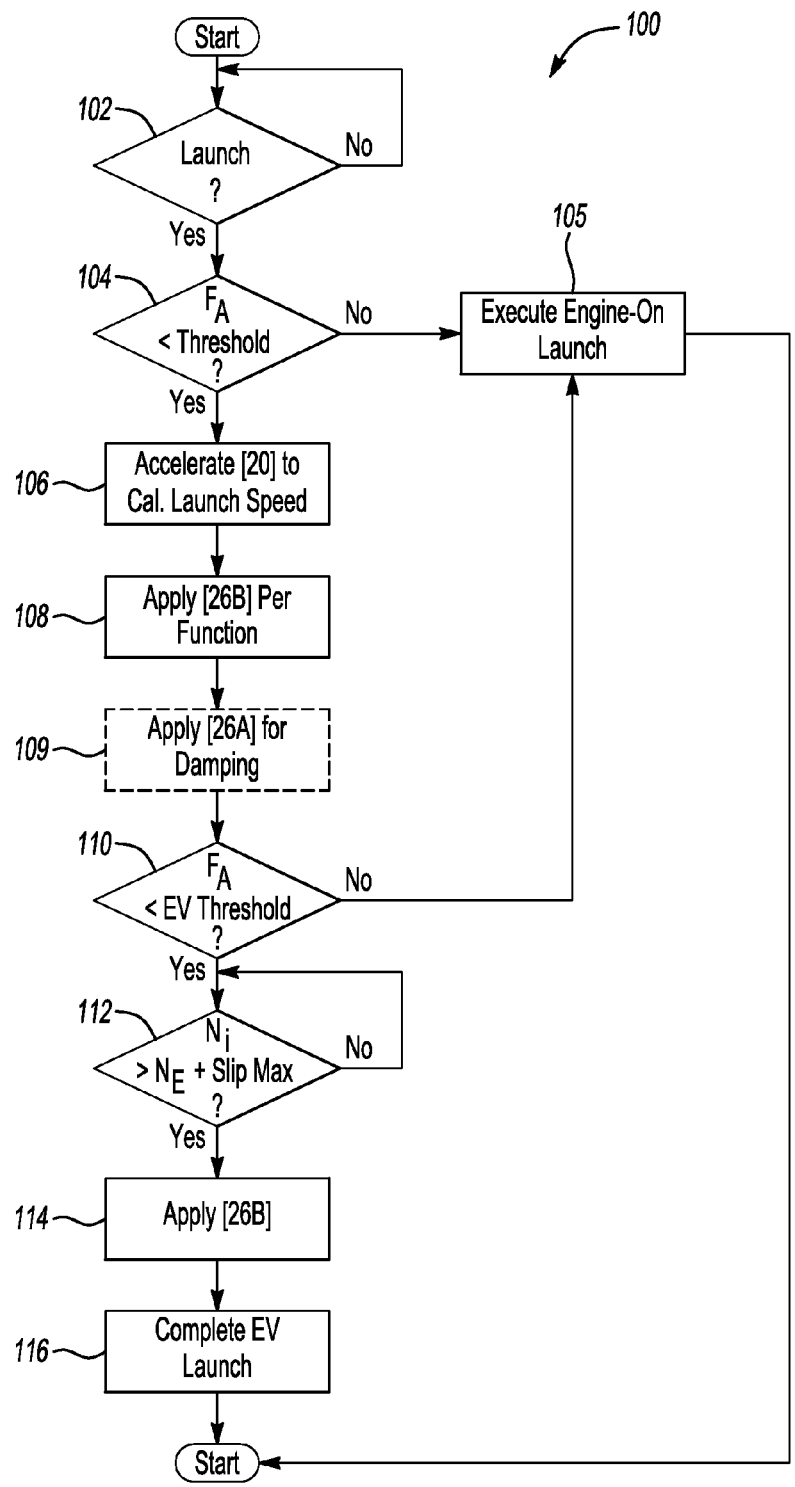
FIG. 3 is a graphical flow chart describing a powertrain control algorithm for the vehicle shown in FIG. 1.

Referring to FIG. 3 in conjunction with the structure of vehicle 10 as shown in FIG. 1, algorithm 100 begins with step 102, wherein the controller 14 determines whether an operator of the vehicle desires a launch. For example, sensors embedded within or electrically connected to the accelerator pedal 15 can detect a minimal threshold level of force. Step 102 continues in a loop until launch is signaled, and then proceeds to step 104.

At step 104, the controller 14 processes the force applied to the accelerator pedal 15, abbreviated $F_A$ in FIG. 3, to determine what type of launch is required. If an amount of force is detected that exceeds a threshold, e.g., approximately 40-60% of pedal capacity, then the algorithm 100 proceeds to step 105. When the force ($F_A$) falls within a calibrated range, e.g., approximately 10 to 20% of total pedal range or capacity, the algorithm 100 proceeds to step 106.

At step 105, controller 14 executes an engine-on launch in the conventional manner. That is, the engine 12 is started via the MGU 16 via the BAS system noted above using an existing engine-on launch algorithm (not shown). The algorithm 100 is then finished.

At step 106, controller 14 uses the MGU 16 and belt 18 of FIG. 1 to accelerate the crankshaft 20 to a calibrated minimum EV launch speed. The controller 14 uses available measures to minimize engine compression during this phase, e.g., cylinder deactivation or cam phasing. In one embodiment, the minimum EV launch speed is approximately 350 RPM or more, although the actual minimum speed may vary with the particular vehicle in which the algorithm 100 is applied. The calibrated EV launch speed should exceed the NVH boundary 52 of FIG. 2 to avoid mount and/or isolator resonance frequencies, as understood in the art. Once the crankshaft 20 rotates at its minimum speed in excess of the NVH boundary 52, the algorithm 100 proceeds to step 108.

At step 108, the controller 14 applies the designated DCT clutch, e.g., the odd-gear clutch 26B, according to a predetermined torque function. For example, controller 14 may apply the odd-gear clutch 26B to satisfy the equation:

$$T_{IN}=f(T_o,\text{gearstate})=f(P_x,N_o,\text{gearstate}),$$

where $T_{IN}$ and $T_o$ are the input and output torque to the odd-gear clutch 26B, $P_x$ is the pedal position for pedal 15, and No is the output speed of the DCT 22. The algorithm 100 then may proceed to optional step 109, or directly to step 110.

At step 109, controller 14 may apply and slip the other DCT clutch, i.e., even-gear clutch 26A in the embodiment described herein, to provide sufficient damping torque, e.g., per a calibrated value, before proceeding to step 110.

At step 110, controller 14 determines if the force ($F_A$) applied to the pedal 15 exceeds the calibrated EV threshold, as noted above, and if so, proceeds to step 105. In this manner, if force applied to the pedal 15 ever changes during execution of the algorithm 100 such that the force surpasses the engine-on launch threshold, algorithm 100 effectively ends, and exits to the engine-on algorithm.

At step 112, the controller 14 determines whether input speed ($N_I$) into the DCT 24 exceeds a function of engine speed ($N_E$). For example, the controller 14 may consider the following formula: $N_I>N_E+\text{slip}_{MAX}$, where the value $\text{slip}_{MAX}$ refers to a calibrated level of allowable slip at zone 54 of FIG. 2, i.e., a zone corresponding to the turbine/pump lockup zone of a vehicle having a conventional torque converter as understood in the art. Step 112 repeats in a loop until the input speed exceeds the required value, and then proceeds to step 114.

At step 114, the controller 14 transitions to a synchronized mode in zone 54 of FIG. 2 when the crankshaft speed approaches the transmission input speed. The odd-gear clutch 26B is applied with an allowable amount of slip in zone 54. EV launch is therefore controlled using the odd-gear clutch 26B of the DCT 24, with the slipping clutch isolating the downstream drivetrain from oscillations. The even-gear clutch 26A may be applied and slipped as needed, e.g., as a noise or rattle countermeasure, as explained above with reference to step 109.

At step 116, EV launch is completed, and the algorithm 100 is finished.

While the best modes for carrying out the invention have been described in detail, those familiar with the art to which this invention relates will recognize various alternative designs and embodiments for practicing the invention within the scope of the appended claims.

The invention claimed is:

1. A method for providing an electric-only (EV) launch mode in a vehicle having an accelerator pedal, an engine having a crankshaft, a motor generator unit (MGU), a dual-clutch transmission (DCT) with an odd-gear clutch and an even-gear clutch, wherein the vehicle is adapted for selectively rotating the crankshaft using motor torque from the MGU, the method comprising:
   using motor torque from the MGU, while the engine is off, to increase a rotational speed of the crankshaft to above a calibrated minimum EV launch speed when a threshold minimum force is applied to the accelerator pedal;
   minimizing engine compression via a controller while increasing the rotational speed of the crankshaft;
   controlling an operation of a designated clutch of the odd-gear clutch and the even-gear clutch according to a predetermined torque function until input torque to the DCT equals or exceeds a calibrated level;
   slipping the odd-gear clutch or the even-gear clutch that is not designated, while increasing the rotational speed of the crankshaft, in order to dampen drivetrain oscillations; and
   launching the vehicle in the EV launch mode via the designated clutch when an input speed to the DCT exceeds a function of engine speed.

2. The method of claim 1, wherein the designated clutch is the odd-gear clutch, and wherein launching the vehicle occurs in one of first gear and third gear.

3. The method of claim 1, wherein the designated clutch is the even-gear clutch, and wherein launching the vehicle occurs in second gear.

4. The method of claim 1, wherein the threshold minimum force is approximately 10 percent of a capacity of the pedal, further comprising: defaulting to an engine-on launch mode when a threshold maximum force of approximately 20 to approximately 30 percent of the threshold minimum force is applied to the pedal.

5. The method of claim 1, wherein minimizing engine compression includes using one of: cylinder deactivation and cam phasing.

6. The method of claim 1, wherein the calibrated launch speed exceeds a predetermined noise, vibration, and harshness threshold.

7. The method of claim 1, wherein the DCT is a dry DCT.

8. A vehicle comprising:
   an accelerator pedal;
   an engine having a crankshaft;
   a motor generator unit (MGU) connectable to the crankshaft, and adapted for selectively generating a motor torque;
   a dual-clutch transmission (DCT) with an odd-gear input clutch and an even-gear input clutch; and
   a controller adapted for launching the vehicle in an electric-only (EV) launch mode;
   wherein the controller is adapted to:
      use the motor torque from the MGU, while the engine is off, to increase a rotational speed of the crankshaft to above a calibrated minimum EV launch speed when a threshold minimum force is applied to the accelerator pedal;
      minimize engine compression while increasing the rotational speed of the crankshaft;
      apply a designated one of the odd-gear clutch and the even-gear clutch according to a predetermined torque function until input torque to the DCT equals or exceeds a calibrated level;
      slip the other of the odd-gear clutch and the even-gear clutch, while increasing the rotational speed of the crankshaft, to dampen drivetrain oscillations; and launch the vehicle in the EV launch mode via the odd-gear clutch when the rotational speed of the crankshaft exceeds an input speed of the DCT.

9. The vehicle of claim 8, wherein the odd-gear clutch is the designated clutch, and wherein the controller is adapted for launching the vehicle in one of first gear and third gear.

10. The vehicle of claim 8, wherein the even-gear clutch is the designated clutch, and wherein the controller is adapted for launching the vehicle in second gear.

11. The vehicle of claim 8, wherein the threshold minimum force is approximately 10 percent of a capacity of the pedal, and wherein the controller is adapted for defaulting to an engine-on launch mode when a threshold maximum force of approximately 30 percent to approximately 40 percent of the threshold minimum force is applied to the pedal.

12. The vehicle of claim 8, wherein the controller minimizes engine compression using one of: cylinder deactivation and cam phasing.

13. The vehicle of claim 8, wherein the DCT is a dry DCT.

14. A controller adapted for use with a vehicle having an accelerator pedal, an engine having a crankshaft, a motor generator unit (MGU) connectable to the crankshaft and adapted for generating a motor torque, and a dual-clutch transmission (DCT) with an odd-gear clutch and an even-gear clutch, the controller comprising:
   a hardware module; and
   an algorithm recorded in memory and executable by the hardware module, and for launching the vehicle in an electric-only (EV) launch mode;
   wherein the controller is adapted for configured to:
      use the motor torque from the MGU, while the engine is off, to increase a rotational speed of the crankshaft to above a calibrated minimum EV launch speed when a threshold minimum force is applied to the accelerator pedal;
      minimize engine compression while increasing the rotational speed of the crankshaft;
      control an operation of a designated one of the odd-gear clutch and the even-gear clutch until input torque to the DCT equals a calibrated level;
      slip the other of the odd-gear clutch and the even-gear clutch, while increasing the rotational speed of the crankshaft, to dampen drivetrain oscillations; and
      launch the vehicle in the EV launch mode via the designated clutch when an input speed to the DCT exceeds a function of engine speed.

15. The controller of claim 14, wherein the odd-gear clutch is the designated clutch, and wherein the controller is adapted for launching the vehicle in one of first gear and third gear.

16. The controller of claim 14, wherein the even-gear clutch is the designated clutch, and wherein the controller is adapted for launching the vehicle in second gear.

17. The controller of claim 14, wherein the threshold minimum force is approximately 10 percent of a capacity of the pedal, and wherein the controller is adapted for defaulting to an engine-on launch mode when a threshold maximum force is applied to the pedal, the threshold maximum force being approximately 20 percent to approximately 30 percent of the threshold minimum force.

18. The controller of claim 14, wherein the controller is configured to minimize the engine compression using one of: cylinder deactivation and cam phasing.

19. The controller of claim 14, wherein the DCT is a dry DCT.

* * * * *